United States Patent
Wu

(10) Patent No.: US 11,196,658 B2
(45) Date of Patent: Dec. 7, 2021

(54) INTERMEDIATE SYSTEM TO INTERMEDIATE SYSTEM ROUTING PROTOCOL BASED NOTIFICATION METHOD AND APPARATUS

(71) Applicant: XI'AN ZHONGXING NEW SOFTWARE CO., LTD., Xi'An (CN)

(72) Inventor: Qiang Wu, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/627,829

(22) PCT Filed: Jul. 27, 2018

(86) PCT No.: PCT/CN2018/097510
§ 371 (c)(1),
(2) Date: Dec. 31, 2019

(87) PCT Pub. No.: WO2019/020113
PCT Pub. Date: Jan. 31, 2019

(65) Prior Publication Data
US 2020/0169497 A1  May 28, 2020

(30) Foreign Application Priority Data
Jul. 27, 2017  (CN) .......... 201710622913.0

(51) Int. Cl.
*H04L 12/757* (2013.01)
*H04L 12/721* (2013.01)

(52) U.S. Cl.
CPC .......... *H04L 45/023* (2013.01); *H04L 45/124* (2013.01)

(58) Field of Classification Search
CPC ..... H04L 45/023; H04L 45/123; H04L 45/02; H04L 45/121; H04L 45/124; H04L 45/28;
(Continued)

(56) References Cited

U.S. PATENT DOCUMENTS 5,251,205 A * 10/1993 Callon .................... H04L 29/06
370/392
8,681,823 B2 * 3/2014 Kini ....................... H04L 45/507
370/503
(Continued)

FOREIGN PATENT DOCUMENTS

CN 101043425 A 9/2007
CN 101136730 A 3/2008
(Continued)

OTHER PUBLICATIONS

Lin CN102664809B original document with translation (Year: 2012).*
(Continued)

*Primary Examiner* — Wutchung Chu
(74) *Attorney, Agent, or Firm* — Kacvinsky Daisak Bluni PLLC

(57) ABSTRACT

Provided is an intermediate system to intermediate system routing protocol based notification method. The method includes: within a delay period since an intermediate system (IS) establishes a new neighbor, notifying the outside through a link state protocol (LSP) data packet that a METRIC for traffic of the IS reaching the new neighbor is a preset value; after the delay period expires, restoring the METRIC to a normal value, where the preset value is greater than the normal value. Further provided are an intermediate system to intermediate system routing protocol based notification apparatus, a storage medium and a processor.

16 Claims, 2 Drawing Sheets

---

Within a delay period since an intermediate system (IS) establishes a new neighbor, notify the outside through a link state protocol (LSP) data packet that a METRIC for traffic of the IS reaching the new neighbor is a preset value — S102

After the delay period expires, restore the METRIC to a normal value, where the preset value is greater than the normal value — S104

(58) Field of Classification Search
CPC ..... H04L 41/0816; H04L 45/32; H04L 69/06;
H04L 45/54; H04L 47/125; H04L 45/00;
H04L 45/507; H04L 43/10; H04L 45/56;
H04L 47/10; H04L 45/021; H04L 45/245;
H04L 45/26; H04L 41/0668; H04L 45/42;
H04L 47/746; H04L 45/50; H04L 45/12;
H04L 45/52; H04L 47/127; H04L
12/6418; H04L 45/22; H04L 45/04; H04L
41/12; H04L 12/4633; H04L 47/825;
H04L 45/16; H04L 45/24; H04L 43/0811;
H04L 43/50; H04L 45/125
See application file for complete search history.

(56) References Cited

U.S. PATENT DOCUMENTS

| | | | |
|---|---|---|---|
| 2002/0048398 A1 | 4/2002 | Bokhour | |
| 2003/0117950 A1* | 6/2003 | Huang | H04L 45/00 370/220 |
| 2005/0089027 A1* | 4/2005 | Colton | H04Q 11/0005 370/380 |
| 2006/0056328 A1* | 3/2006 | Lehane | H04L 45/26 370/315 |
| 2006/0092952 A1* | 5/2006 | Boutros | H04L 47/745 370/400 |
| 2009/0324232 A1* | 12/2009 | So | H04Q 11/0062 398/83 |
| 2010/0002586 A1 | 1/2010 | Charzinski et al. | |
| 2010/0008222 A1* | 1/2010 | Le Roux | H04L 45/50 370/228 |
| 2010/0226382 A1* | 9/2010 | Kini | H04L 45/28 370/401 |
| 2011/0044348 A1* | 2/2011 | Kini | H04L 45/02 370/401 |
| 2011/0096780 A1* | 4/2011 | Darwish | H04L 45/507 370/392 |
| 2012/0195229 A1* | 8/2012 | Chen | H04L 45/12 370/254 |
| 2014/0376562 A1 | 12/2014 | Zhang | |
| 2015/0222557 A1* | 8/2015 | Bhattacharya | H04L 41/00 370/237 |
| 2016/0261721 A1 | 9/2016 | Wu et al. | |
| 2017/0195214 A1* | 7/2017 | Wu | H04L 45/26 |
| 2017/0289027 A1* | 10/2017 | Ratnasingham | H04L 45/04 |
| 2018/0302807 A1* | 10/2018 | Chen | H04L 45/22 |

FOREIGN PATENT DOCUMENTS

| | | |
|---|---|---|
| CN | 102342050 A | 2/2012 |
| CN | 102664809 A | 9/2012 |
| CN | 104506374 A | 4/2015 |
| CN | 106572008 A | 4/2017 |

OTHER PUBLICATIONS

European Search Report and Written Opinion for the European Patent Application No. EP18838340, dated Nov. 20, 2020, 7 pages.
International Search Report for the International Patent Application No. PCT/CN2018/097510, dated Oct. 24, 2018, 2 pages.
Search Report for the Chinese Patent Application No. 2017106229130, dated Jun. 21, 2021, 3 pages.
Office Action for the Chinese Patent Application No. 2017106229130, dated Jun. 21, 2021, 5 pages.

\* cited by examiner

Within a delay period since an intermediate system (IS) establishes a new neighbor, notify the outside through a link state protocol (LSP) data packet that a METRIC for traffic of the IS reaching the new neighbor is a preset value — S102

After the delay period expires, restore the METRIC to a normal value, where the preset value is greater than the normal value — S104

INTERMEDIATE SYSTEM TO INTERMEDIATE SYSTEM ROUTING PROTOCOL BASED NOTIFICATION METHOD AND APPARATUS

CROSS-REFERENCE TO RELATED APPLICATIONS

This application is a national stage application claiming the benefit of and priority to International Application No. PCT/CN2018/097510 entitled "INTERMEDIATE SYSTEM TO INTERMEDIATE SYSTEM ROUTING PROTOCOL BASED NOTIFICATION METHOD AND APPARATUS" filed Jul. 27, 2018, which claims priority to Chinese Patent Application No. 201710622913.0, filed on Jul. 27, 2017, the contents of both of which are incorporated herein by reference in their entireties.

TECHNICAL FIELD

The present disclosure relates to communications, for example, to an intermediate system to intermediate system routing protocol based notification method and an apparatus.

BACKGROUND

An intermediate system to intermediate system routing protocol (ISIS protocol) is a dynamic, interior gateway protocol (IGP) based on a link state. After a neighbor relationship is established through hello message interactive negotiation in the ISIS protocol, each IS generates a link-state protocol (LSP) data packet to describe link state information thereof, and sends the LSP data packet to a network, and also stores LSP data packets sent from all ISs on the network topology, so as to form a link state database (LSDB). ISIS is used for calculating, based on the LSDB, a best route to a destination address through a shortest path first (SPF) algorithm.

After a relationship between an IS and a new neighbor is established (i.e., UP), the IS is immediately triggered to regenerate a LSP, and notifies of the generations of the new neighbor through the LSP. Meanwhile, the IS also performs the topology calculation and the routing calculation again. However, there exists a problem at this time. If the neighbor oscillates frequently between the UP and the DOWN because a link on which the neighbor is located has a problem, all ISs on the network frequently respond to this oscillation, and frequently perform the topology calculation and the routing calculation. And all ISs on the network frequently performing the topology calculation and the routing calculation always has a short-term loop, thereby affecting traffic forwarding in the network, and the traffic is intermittent.

SUMMARY

Embodiments of the present disclosure provide an intermediate system to intermediate system routing protocol based notification method and apparatus for at least solving the problem in the existing art of neighbor oscillation caused by a problem of a link on which the neighbor is located.

According to an embodiment of the present disclosure, an intermediate system to intermediate system routing protocol based notification method is provided. The method includes: within a delay period since an intermediate system (IS) establishes a new neighbor, notifying the outside through a link state protocol (LSP) data packet that a METRIC for traffic of the IS reaching the new neighbor is a preset value; after the delay period expires, restoring the METRIC to a normal value, where the preset value is greater than the normal value.

According to another embodiment of the present disclosure, an intermediate system to intermediate system routing protocol based notification apparatus is provided. The apparatus includes: a notification module configured to, within a delay period since an intermediate system (IS) establishes a new neighbor, notify the outside through a link state protocol (LSP) data packet that a METRIC for traffic of the IS reaching the new neighbor is a preset value; and a restoring module configured to restore the METRIC to a normal value after the delay period expires, where the preset value is greater than the normal value.

According to another embodiment of the present disclosure, a computer-readable storage medium is further provided. The storage medium is configured to store computer programs which, when executed by a professor, implement the above method.

In an embodiment, the storage medium is further configured to store program codes for executing the following steps: within a delay period since an intermediate system (IS) establishes a new neighbor, notifying the outside through a link state protocol (LSP) data packet that a METRIC for traffic of the IS reaching the new neighbor is a preset value; restoring the METRIC to a normal value after the delay period expires, where the preset value is greater than the normal value.

A processor is further provided by another embodiment of the present disclosure. The processor is configured to execute a program for executing the above method.

BRIEF DESCRIPTION OF DRAWINGS

The drawings described herein are used to provide an understanding of the present disclosure, and form a part of the present application. The exemplary embodiments and descriptions thereof in the present disclosure are used to explain the present disclosure and do not limit the present disclosure in any improper way. In the drawings.

DETAILED DESCRIPTION

The present disclosure will be described hereinafter in detail with reference to the drawings and in conjunction with embodiments. The terms "first", "second" and the like in the description, claims and above drawings of the present disclosure are used to distinguish between similar objects and are not necessarily used to describe a particular order or sequence.

Embodiment One

Figures 1, 2:
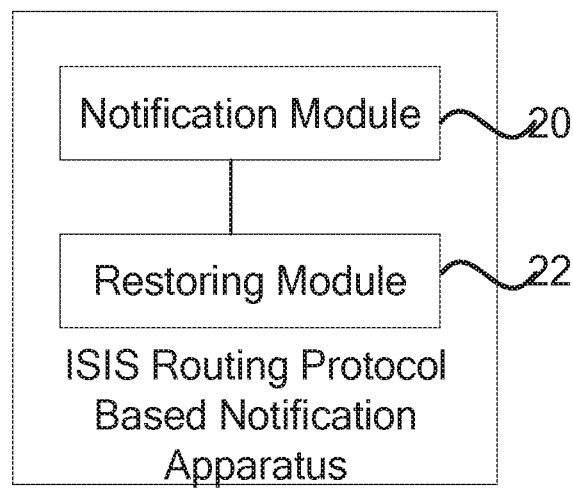
FIG. 1 is a flowchart of an ISIS routing protocol based notification method according to an embodiment of the present disclosure.
FIG. 2 is a block diagram of an ISIS routing protocol based notification apparatus according to an embodiment of the present disclosure.

The embodiment provides an ISIS routing protocol based notification method. FIG. 1 is a flowchart of an ISIS routing protocol based notification method according to an embodiment of the present disclosure. As shown in FIG. 1, the process includes steps described below.

In step S102, within a delay period since an intermediate system (IS) establishes a new neighbor, the outside is notified through a link state protocol (LSP) data packet that a METRIC for traffic of the IS reaching the new neighbor is a preset value.

In step S104, after the delay period expires, the METRIC is restored to a normal value, where the preset value is greater than the normal value.

Through the above steps, since the outside is notified during the delay period that the METRIC for traffic of the IS reaching the new neighbor is a preset value, and the METRIC is restored to the normal value after the delay period expires, the technical problem of neighbor oscillation caused by the problem of a link on which the neighbor is located is solved, the network topology and routing oscillation caused by the neighbor oscillation is suppressed, and poor user experience caused by traffic intermittent is eliminated. In an embodiment, the outside may be understood as all ISs other than the IS in a network where the IS is located.

In an embodiment, the above steps maybe executed by various devices supporting the ISIS protocol, such as a router, a switch and the like, but the present disclosure is not limited to this.

In an embodiment, the preset value includes at least one of: a maximum protocol value and a sum of a value and the normal value, such as a maximum value 16777214 and a default configuration value 10 plus 3000, and the normal value is an actual configured value.

In an embodiment, the solution of this embodiment further includes: within the delay period since the IS establishes the new neighbor, a topology calculation or a routing calculation is performed according to the preset value.

In an optional implementation mode of this embodiment, two different scenarios are related. The delay period since the IS establishes the new neighbor includes one of: a delay period since the IS establishes the new neighbor on a broadcast link; a delay period since the IS establishes the new neighbor on a point-to-point link. That is, a scenario in which the IS establishes the new neighbor on the broadcast link, and a scenario in which the IS establishes the new neighbor on the point-to-point link.

According to the above different scenarios, step S102 includes: in a case where a link between the IS and the new neighbor is the broadcast link, notifying the outside through the LSP data packet that a METRIC for the traffic of the IS reaching a pseudo node on the broadcast link is the preset value; and in a case where a link between the IS and the new neighbor is the point-to-point link, notifying the outside through the LSP data packet that the METRIC for the traffic of the IS reaching the new neighbor is the preset value.

According to different scenarios, Step 104 includes: in the case where the link between the IS and the new neighbor is the broadcast link, restoring the METRIC for the traffic of the IS reaching the pseudo node to a first normal value; and in a case where a link between the IS and the new neighbor is the point-to-point link, restoring the METRIC for the traffic of the IS reaching the new neighbor to a second normal value.

In an embodiment, the first normal value and the second normal value may be the same or different.

From the description of the embodiment described above, it will be apparent to those skilled in the art that the method in the embodiment described above may be implemented by software plus a general-purpose hardware platform, or may of course be implemented by hardware. However, in many cases, the former is a preferred implementation mode. Based on such understanding, the solution provided by the present disclosure may be embodied in the form of a software product. The computer software product is stored in a storage medium (such as a read-only memory (ROM), a random-access memory (RAM), a magnetic disk or an optical disk) and the storage medium includes multiple instructions for enabling a terminal device (which may be a mobile phone, a computer, a server, or a network device) to execute the method described in each embodiment of the present disclosure.

Embodiment Two

An embodiment of the present disclosure further provides an ISIS routing protocol based notification apparatus. The apparatus is configured to implement the embodiment and implementation mode described above. What has been described will not be repeated. As used below, a term "module" may be software, hardware or a combination thereof capable of implementing predetermined functions. The apparatus in the embodiment described below is preferably implemented by software, but implementation by hardware or by a combination of software and hardware is also possible and conceived.

FIG. 2 is a block diagram of an ISIS routing protocol based notification apparatus according to an embodiment of the present disclosure. The apparatus may be applied to various devices supporting the ISIS, such as a router and a switch. As shown in FIG. 2, the apparatus includes: a notification module 20, which is configured to, within a delay period since an intermediate system (IS) establishes a new neighbor, notify the outside through a link state protocol (LSP) data packet that a METRIC for traffic of the IS reaching the new neighbor is a preset value; a restoring module 22, which is configured to restore the METRIC to a normal value after the delay period expires, where the preset value is greater than the normal value.

In this embodiment, the preset value includes one of: a maximum protocol value and a sum of a value and the normal value.

In an embodiment, the delay period since the IS establishes the new neighbor includes one of: a delay period since the IS establishes the new neighbor on a broadcast link; a delay period since the IS establishes the new neighbor on a point-to-point link.

In an embodiment, the notification module 20 is configured to: in a case where a link between the IS and the new neighbor is the broadcast link, notify the outside through the LSP data packet that a METRIC for the traffic of the IS reaching a pseudo node on the broadcast link is the preset value; and in a case where a link between the IS and the new neighbor is a point-to-point link, notify the outside through the LSP data packet that the METRIC for the traffic of the IS reaching the new neighbor is the preset value.

In an embodiment, the restoring module 22 is configured to: in a case where a link between the IS and the new neighbor is the broadcast link, restore the METRIC for the traffic of the IS reaching the pseudo node to a first normal value; and in a case where a link between the IS and the new neighbor is the point-to-point link, restore the METRIC for the traffic of the IS reaching the new neighbor to a second normal value.

In an embodiment, the notification module 20 is further configured to:

within the delay period since the IS establishes the new neighbor, perform a topology calculation or a routing calculation according to the preset value.

In one embodiment, each module described above may be implemented by software or hardware. Implementation by hardware may, but may not necessarily, be performed in the following manners: the each module is located in a different processor in any combination form.

Embodiment Three

This embodiment is an optional embodiment of the present disclosure, used for describing the present application in detail in conjunction with examples and scenarios.

The present disclosure provides a delay method for routing calculation after a neighbor is established by the ISIS protocol. Within a delay period since the neighbor is established, the IS notifies through a LSP data packet that a METRIC of the related neighbor is a maximum value or an increased value, and performs topology and routing calculations according to the related METRIC; after the delay period expires, the IS restores the METRIC to a normal value, and uses the normal value to perform the topology and routing calculations. This method suppresses network topology and routing oscillation brought by the neighbor oscillation, and eliminates poor user experience caused by traffic intermittent.

With respect to the condition where the link has the problem and causes the neighbor oscillation described above, the present disclosure proposes a method for delaying routing calculation after a neighbor is established.

To solve the above problem, technical solutions in the present disclosure are implemented as follows.

(1) Within a delay period since an IS establishes a new neighbor on a broadcast link, the IS notifies the outside through a LSP generated by the IS itself that an METRIC for traffic of the IS reaching a pseudo node on the link is a maximum value 16777214 or a normal configuration value plus a value (such as: a default configuration value 10 plus 3000). Meanwhile, the IS performs a topology calculation or a routing calculation according to the METRIC for the traffic of the IS reaching the new neighbor in the delay period, which is the maximum value 16777214 or the normal configuration value plus a value. In an embodiment, the maximum value 16777214 is only an example, and is not intended to limit the present disclosure.

(2) Within a delay period since an IS establishes a new neighbor on a point-to-point link, the IS notifies the outside through a LSP generated by the IS itself that an METRIC for traffic of the IS reaching the new neighbor is a maximum value 16777214 or a normal configuration value plus a value (such as: a default configuration value 10 plus 3000). Meanwhile, the IS performs a topology calculation or a routing calculation according to the METRIC for the traffic of the IS reaching the new neighbor in the delay period, which is the maximum value 16777214 or the normal configuration value plus a value.

(3) After the delay period since an IS establishes a new neighbor on a broadcast link expires, the IS updates the METRIC for the traffic of the IS reaching the pseudo node included on the link to be a normal value, and a default normal value is 10. Meanwhile, the IS performs the topology calculation or the routing calculation according to the METRIC for the traffic of the IS reaching the pseudo node in the delay period, which is the normal value (10 by default).

(4) After the delay period since an IS establishes a new neighbor on a point-to-point link expires, the IS updates the METRIC for the traffic of the IS reaching the new neighbor included on the link to be a normal value, and a default normal value is 10. Meanwhile, the IS performs the topology calculation or the routing calculation according to the METRIC for the traffic of the IS reaching the new neighbor in the delay period, which is the normal value (10 by default). In an embodiment, the normal value may be determined according to the actual application.

This embodiment further includes implementation examples described below.

Implementation Example One

Figure 3:
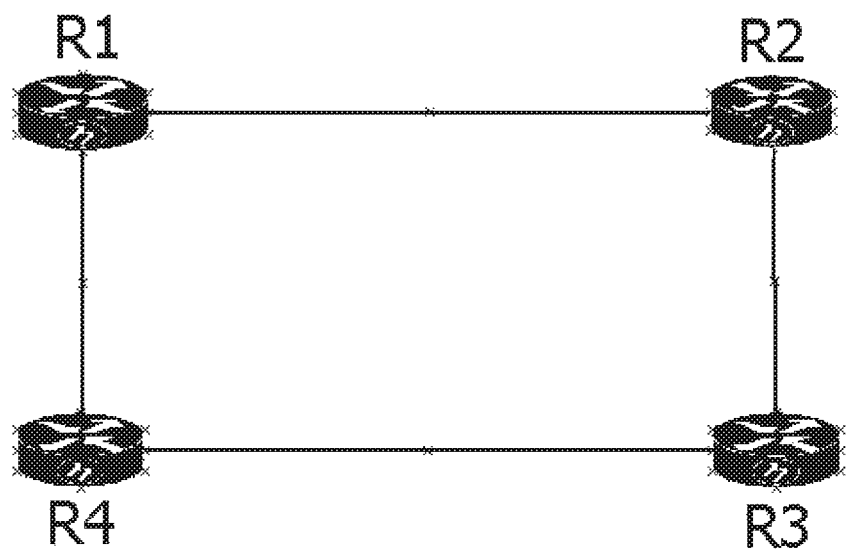
FIG. 3 is a schematic diagram of a network architecture according to an embodiment of the present disclosure.

FIG. 3 is a schematic diagram of a network architecture according to an embodiment of the present disclosure. As shown in FIG. 3, a network is formed by routers R1, R2, R3 and R4. The METRIC of a link from R1 to R2 is 1, the METRIC of a link from R2 to R3 is 1, the METRIC of a link from R3 to R4 is 1, and the METRIC of a link from R1 to R4 is 10. All routers establish neighbor relationships based on a broadcast network.

In the existing art, assuming to pay attention to traffic from R1 to R4, before a neighbor relationship from R1 to R2 is established, the traffic from R1 to R4 goes through R1->R4. If the neighbor relationship from R1 to R2 is established, the traffic from R1 to R4 is switched to R1->R2->R3->R4. If a problem exists on the link between R1 and R2, a neighbor relationship from R1 to R2 is caused to oscillate. As a result, all devices of the network formed by R1, R2, R3 and R4 undergo dramatic topology and route oscillation. Meanwhile, the traffic from R1 to R4 also oscillates between the traffic on the route R1->R4 and the traffic on the route R1->R2->R3->R4, and packet loss occurs due to a convergence process, thus the traffic from R1 to R4 is intermittent.

Though the solutions of the present disclosure, before the neighbor relationship from R1 to R2 is established, the traffic from R1 to R4 directly goes through R1->R4. If the neighbor relationship from R1 to R2 is established, R1 notifies through the LSP that the METRIC for reaching a pseudo node between R1 and R2 is the maximum value 16777214. Apparently, the METRIC of 10 for the traffic from R1 to R4 going through R1->R4 is still the best path. If a problem exists on the link between R1 and R2 in this case, which causes the neighbor relationship from R1 to R2 to oscillate, then the traffic from R1 to R4 always goes through R1->R4. If the neighbor relationship from R1 to R2 is established and is in a stable state for a delay period, then R1 notifies through the LSP that the METRIC for reaching the pseudo node between R1 and R2 is restored to 1. In this case, the traffic is switched to go through the route R1->R2->R3->R4. Apparently, the method in the present disclosure suppresses overall network oscillation caused by the neighbor oscillation to a certain extent.

Implementation Example Two

As shown in FIG. 3, a network is formed by routers R1, R2, R3 and R4. The METRIC of a link from R1 to R2 is 1, the METRIC of a link from R2 to R3 is 1, the METRIC of a link from R3 to R4 is 1, and the METRIC of a link from R1 to R4 is 10. All routers establish point-to-point neighbor relationships.

In the existing art, assuming to pay attention to traffic from R1 to R4, before a neighbor relationship from R1 to R2 is established, the traffic from R1 to R4 goes through R1->R4. If the neighbor relationship from R1 to R2 is established, the traffic from R1 to R4 is switched to R1->R2->R3->R4. If a problem exists on the link between R1 and R2 in this case, a neighbor relationship from R1 to R2 is caused to oscillate. As a result, all devices of the network formed by R1, R2, R3 and R4 undergo dramatic topology and route oscillation. Meanwhile, the traffic from R1 to R4 also oscillates between the traffic on the route R1->R4 and the traffic on the route R1->R2->R3->R4, and packet loss occurs due to the convergence process, thus the traffic from R1 to R4 is intermittent.

Through the solutions of the present disclosure, before the neighbor relationship from R1 to R2 is established, the traffic from R1 to R4 directly goes through R1->R4. If the neighbor relationship from R1 to R2 is established, R1 notifies through the LSP that the METRIC for reaching R2 is the maximum value 16777214. Apparently, the METRIC of 10 for the traffic from R1 to R4 going through R1->R4 is still the best path. If a problem exists on the link between R1 and R2 in this case, which causes the neighbor relationship from R1 to R2 to oscillate, then the traffic from R1 to R4 always goes through R1->R4. If the neighbor relationship from R1 to R2 is established and still in a stable state for a delay period, then R1 notifies through the LSP That the METRIC for reaching R2 is restored to 1. In this case, the traffic is switched to the route R1->R2->R3->R4. Apparently, the method in the present disclosure suppresses overall network oscillation caused by the neighbor oscillation to a certain extent.

This delay method for routing calculation after a neighbor is established by the ISIS protocol has the following advantages: suppressing severe impacts of the neighbor oscillation. Frequent neighbor oscillation causes frequent updating of LSPs and that all intermediate systems on the network frequent trigger topology and routing calculations, and that frequent traffic route switch brings severe intermittent impacts to the user.

Embodiment Four

An embodiment of the present disclosure further provides a storage medium. In this embodiment, the storage medium is configured to store program codes for executing steps described below.

In step S1, within a delay period since an intermediate system (IS) establishes a new neighbor, the outside is notified through a link state protocol (LSP) data packet that an METRIC for traffic of the IS reaching the new neighbor is a preset value.

In step S2, after the delay period expires, the METRIC is restored to a normal value, where the preset value is greater than the normal value.

In this embodiment, the storage medium may include, but is not limited to, a universal serial bus flash disk, a read-only memory (ROM), a random access memory (RAM), a mobile hard disk, a magnetic disk, an optical disk or another medium capable of storing program codes.

In this embodiment, a processor is used to execute the following steps according to the program codes stored in the storage medium: within a delay period since an intermediate system (IS) establishes a new neighbor, notifying the outside through a link state protocol (LSP) data packet that a METRIC for the traffic of the IS reaching a pseudo node is a preset value.

In this embodiment, the processor is configured to, according to the program codes stored in the storage medium, restore the METRIC to a normal value after the delay period expires, where the preset value is greater than the normal value.

For specific examples in the embodiment, reference may be made to the examples described in the above embodiments and optional implementation modes, and the specific examples will not be repeated in this embodiment.

Apparently, it is to be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, in an embodiment, the modules or steps may be implemented by program codes executable by the computing apparatuses, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

What is claimed is:

1. An intermediate system to intermediate system routing protocol based notification method, comprising:
within a delay period since an intermediate system (IS) establishes a new neighbor, notifying all ISs in a network where the IS is located except the IS itself through a link state protocol (LSP) data packet that a METRIC for traffic of the IS reaching the new neighbor is a preset value;
after the delay period expires, restoring the METRIC to a normal value, wherein the preset value is greater than the normal value,
wherein the preset value comprises a sum of one value and the normal value.

2. The method of claim 1, wherein the preset value further comprises:
a maximum protocol value.

3. The method of claim 1, wherein the delay period since the IS establishes the new neighbor comprises one of:
a delay period since the IS establishes the new neighbor on a broadcast link; and
a delay period since the IS establishes the new neighbor on a point-to-point link.

4. The method of claim 3, wherein notifying the all ISs in the network where the IS is located except the IS itself through a link state protocol (LSP) data packet that a METRIC for traffic of the IS reaching the new neighbor is a preset value comprises:
in response to determining that a link between the IS and the new neighbor is a broadcast link, notifying the all ISs in the network where the IS is located except the IS itself through the LSP data packet that the METRIC for the traffic of the IS reaching a pseudo node on the broadcast link is the preset value; and
in response to determining that a link between the IS and the new neighbor is a point-to-point link, notifying the all ISs in the network where the IS is located except the IS itself through the LSP data packet that the METRIC for the traffic of the IS reaching the new neighbor is the preset value.

5. The method of claim 3, wherein restoring the METRIC to a normal value comprises:
in response to determining that a link between the IS and the new neighbor is a broadcast link, restoring the METRIC for the traffic of the IS reaching a pseudo node on the broadcast link to a first normal value; and in response to determining that a link between the IS and the new neighbor is a point-to-point link, restoring the METRIC for the traffic of the IS reaching the new neighbor to a second normal value.

6. The method of claim 1, further comprising:
within the delay period since the IS establishes the new neighbor, performing a topology calculation or a routing calculation according to the preset value.

7. An intermediate system to intermediate system routing protocol based notification apparatus, comprising a processor and a storage device for storing computer executable instructions that when executed by the processor cause the processor to:
within a delay period since an intermediate system (IS) establishes a new neighbor, notify the all ISs in a network where the IS is located except the IS itself through a link state protocol (LSP) data packet that a METRIC for traffic of the IS reaching the new neighbor is a preset value; and
restore the METRIC to a normal value after the delay period expires, wherein the preset value is greater than the normal value,
wherein the preset value comprises a sum of one value and the normal value.

8. The apparatus of claim 7, wherein the preset value further comprises:
a maximum protocol value.

9. The apparatus of claim 7, wherein the delay period since the IS establishes the new neighbor comprises one of:
a delay period since the IS establishes the new neighbor on a broadcast link; and
a delay period since the IS establishes the new neighbor on a point-to-point link.

10. The apparatus of claim 9, wherein the processor is further configured to:
in response to determining that a link between the IS and the new neighbor is a broadcast link, notify the all ISs in the network where the IS is located except the IS itself through the LSP data packet that the METRIC for the traffic of the IS reaching a pseudo node on the broadcast link is the preset value; and
in response to determining that a link between the IS and the new neighbor is a point-to-point link, notify the all ISs in the network where the IS is located except the IS itself through the LSP data packet that the METRIC for the traffic of the IS reaching the new neighbor is the preset value.

11. The apparatus of claim 9, wherein the processor is further configured to:
in response to determining that a link between the IS and the new neighbor is a broadcast link, restore the METRIC for the traffic of the IS reaching a pseudo node on the broadcast link to a first normal value; and
in response to determining that a link between the IS and the new neighbor is a point-to-point link, restore the METRIC for the traffic of the IS reaching the new neighbor to a second normal value.

12. The apparatus of claim 7, wherein the processor is further configured to:
within the delay period since the IS establishes the new neighbor, perform a topology calculation or a routing calculation according to the preset value.

13. A non-transitory computer-readable storage medium storing computer programs that when executed by a processor cause the processor to perform the method of claim 1.

14. A processor for executing programs, wherein the programs are used for performing the method of claim 1.

15. The method of claim 2, wherein the delay period since the IS establishes the new neighbor comprises one of:
a delay period since the IS establishes the new neighbor on a broadcast link; and
a delay period since the IS establishes the new neighbor on a point-to-point link.

16. The apparatus of claim 8, wherein the delay period since the IS establishes the new neighbor comprises one of:
a delay period since the IS establishes the new neighbor on a broadcast link; and
a delay period since the IS establishes the new neighbor on a point-to-point link.

* * * * *